(12) United States Patent
Nakfour et al.

(10) Patent No.: US 8,958,743 B2
(45) Date of Patent: Feb. 17, 2015

(54) FORMATION OF WIRELESS LOCAL AREA NETWORKS BASED ON MOVEMENT DIRECTION OF NODES

(75) Inventors: Juana E. Nakfour, Hawthorn Woods, IL (US); Michael L. Charlier, Palatine, IL (US); Arnold Sheynman, Northbrook, IL (US)

(73) Assignee: Google Inc., Mountain View, CA (US)

( * ) Notice: Subject to any disclaimer, the term of this patent is extended or adjusted under 35 U.S.C. 154(b) by 1905 days.

(21) Appl. No.: 11/466,650

(22) Filed: Aug. 23, 2006

(65) Prior Publication Data

US 2008/0049688 A1 Feb. 28, 2008

(51) Int. Cl.
*H04B 7/185* (2006.01)
*H04W 8/00* (2009.01)
*H04W 4/02* (2009.01)
*H04W 64/00* (2009.01)
(Continued)

(52) U.S. Cl.
CPC ............. *H04W 8/005* (2013.01); *H04W 4/02* (2013.01); *H04W 64/006* (2013.01); *H04W 76/04* (2013.01); *H04W 84/18* (2013.01); *H04W 84/22* (2013.01); *H04W 88/04* (2013.01)
USPC ............. 455/13.1; 455/11.1; 455/16; 455/15; 455/262; 455/41.2; 455/422.1; 455/426.1; 455/435.1; 455/436; 455/456.1; 370/252; 370/315; 370/254; 370/310; 370/338; 709/221; 709/242

(58) Field of Classification Search
CPC ... H04W 84/18; H04W 40/10; H04W 40/246; H04W 40/248; H04W 40/02; H04W 52/46; H04W 88/04; H04W 40/28; H04W 40/22; H04W 36/0072; H04W 40/32; H04W 52/143; H04W 40/12; H04W 40/20; H04W 40/38
USPC ......... 455/456.1–457, 403, 3.01, 422.1, 11.1, 455/13.1, 15, 262, 41.2, 426.1, 435.1, 436, 455/462, 552.1, 557; 370/223, 338, 252, 370/315, 254, 312, 310, 328, 351, 255; 706/17; 709/221, 242
See application file for complete search history.

(56) References Cited

U.S. PATENT DOCUMENTS 6,282,577 B1 * 8/2001 Okanoue et al. .............. 709/250
6,580,909 B1 6/2003 Carro
(Continued)

FOREIGN PATENT DOCUMENTS

| GB | 2410153 A | 7/2005 |
|---|---|---|
| WO | 0225968 A1 | 3/2002 |
| WO | 0228134 A2 | 4/2002 |

OTHER PUBLICATIONS

Office Action received in Indian Application No. 370/KOLNP/2009 on Jul. 31, 2014, 2 pages.

*Primary Examiner* — Fred Casca
(74) *Attorney, Agent, or Firm* — Fish & Richardson P.C.

(57) ABSTRACT

Mobile nodes without connectivity to a wireless network form mobile ad hoc networks with mobile nodes with connectivity to the wireless network. The moving directions for the mobile nodes are determined. If the mobile nodes are traveling in substantially the same direction the ad hoc network is formed. The mobile nodes then exchange capabilities. If a mobile node without connectivity to a particular network determines that another mobile node in the ad hoc network is connected to the network, the mobile node without connectivity can tunnel data to the network through the other mobile node.

14 Claims, 10 Drawing Sheets

(51) Int. Cl.
    *H04W 76/04*     (2009.01)
    *H04W 84/18*     (2009.01)
    *H04W 84/22*     (2009.01)
    *H04W 88/04*     (2009.01)

(56) References Cited

U.S. PATENT DOCUMENTS

| | | |
|---|---|---|
| 6,862,500 B2 | 3/2005 | Tzamaloukas |
| 6,879,574 B2 | 4/2005 | Naghian et al. |
| 7,545,782 B2 | 6/2009 | Rayment et al. |
| 7,693,093 B2 * | 4/2010 | Riedel et al. ............... 370/260 |
| 2002/0035554 A1 * | 3/2002 | Katsuno et al. ............. 706/17 |
| 2003/0193910 A1 * | 10/2003 | Shoaib et al. ............... 370/331 |
| 2004/0014471 A1 | 1/2004 | Weigand |
| 2004/0157549 A1 | 8/2004 | Dold et al. |
| 2004/0190476 A1 * | 9/2004 | Bansal et al. ................. 370/338 |
| 2004/0230345 A1 | 11/2004 | Tzamaloukas |
| 2004/0258007 A1 * | 12/2004 | Nam et al. .................... 370/310 |
| 2004/0258064 A1 * | 12/2004 | Nakamura et al. ............. 370/389 |
| 2005/0065715 A1 | 3/2005 | Watanabe |
| 2005/0076054 A1 * | 4/2005 | Moon et al. ................. 707/103 Y |
| 2005/0153725 A1 | 7/2005 | Naghian et al. |
| 2005/0185606 A1 | 8/2005 | Rayment et al. |
| 2005/0201316 A1 * | 9/2005 | Fukuhara et al. ............. 370/315 |
| 2006/0003696 A1 * | 1/2006 | Diaz Cervera et al. ...... 455/11.1 |
| 2007/0153707 A1 * | 7/2007 | Thubert et al. ............... 370/254 |
| 2007/0177554 A1 * | 8/2007 | Yang et al. .................... 370/338 |
| 2008/0031209 A1 * | 2/2008 | Abhishek et al. ............. 370/338 |
| 2008/0132233 A1 * | 6/2008 | Li et al. ........................ 455/436 |
| 2009/0010268 A1 * | 1/2009 | Giacomazzi et al. .......... 370/400 |
| 2010/0030423 A1 * | 2/2010 | Nathanson ..................... 701/35 |

* cited by examiner

FORMATION OF WIRELESS LOCAL AREA NETWORKS BASED ON MOVEMENT DIRECTION OF NODES

RELATED APPLICATIONS

The present application is related to U.S. application Ser. No. 11/466,664, filed Aug. 23, 2006.

FIELD

The present application relates to wireless networks, and more particularly to wireless networks that include mobile devices.

BACKGROUND

Wireless networks often include areas in which connectivity is minimal or non-existent due to congestion or other forms of interference. Often this occurs when too many wireless devices connect to provider equipment during a given period of time. The provider equipment becomes overloaded and some users are able to connect to it.

This lack of connectivity can occur in a predicted manner or a random manner. Predicted lack of connectivity occurs at a known time and a known place (e.g. at rush hour on a specific highway or near a stadium after an event). Random lack of connectivity occurs at an unknown time and place (e.g. due to an accident on a highway or a weather event). Predicted lack of connectivity can be addressed by adding resources, such as installing more base stations on site. Although, due to the cost, wireless operators may be unwilling or unable to do so. Random lack of connectivity is even difficult to resolve because it can occur at any time and place. Adding additional resources is not a realistic solution because the cost of adding such resources would be prohibitive.

Accordingly, what is needed is an approach that allows mobile devices without connectivity to form ad hoc networks with devices with network connectivity. The devices without network connectivity can then use the devices with connectivity to exchange data, or tunnel data, through their network.

SUMMARY

In one embodiment, a method, in a mobile node, of initiating formation of a wireless network is provided. A moving direction for the mobile node is determined in response to a predetermined trigger. A network identifier is created that includes the moving direction. The network identifier is broadcast.

In one embodiment a mobile device is provided. The mobile device, includes a first wireless network interface, a direction finding apparatus to determine a moving direction of the mobile device, and a processor configured to request the moving direction from the direction finding apparatus in response to a predetermined trigger, to create a network identifier for a first wireless network, wherein the network identifier includes the moving direction, and to broadcast the network identifier over the first wireless network interface.

In one embodiment, a method for determining, in a mobile node, whether to join a wireless network is provided. A network identifier is received from at least one other mobile node, wherein the network identifier includes a moving direction for the at least one other mobile node. It is determined whether or not the moving direction for the at least one other mobile node meets at least one predetermined criteria. The wireless network is connected to if the moving direction meets the at least one predetermined criteria.

In one embodiment, a mobile device is provided. The mobile device includes a first wireless network interface configured to receive a network identifier from at least one other mobile device, wherein the network identifier includes a moving direction for the at least one other mobile device. A processor is configured to determine whether or not the moving direction for the at least one other mobile device meets at least one predetermined criteria and to connect with the wireless network if the moving direction meets the at least one predetermined criteria.

BRIEF DESCRIPTION OF THE DRAWINGS

For the purpose of facilitating an understanding of the subject matter sought to be protected, there are illustrative embodiments in the accompanying drawing, from an inspection of which, when considered in connection with the following description and claims, the subject matter sought to be protected, its construction and operation, and many of its advantages should be readily understood and appreciated

DETAILED DESCRIPTION

Figure 1:
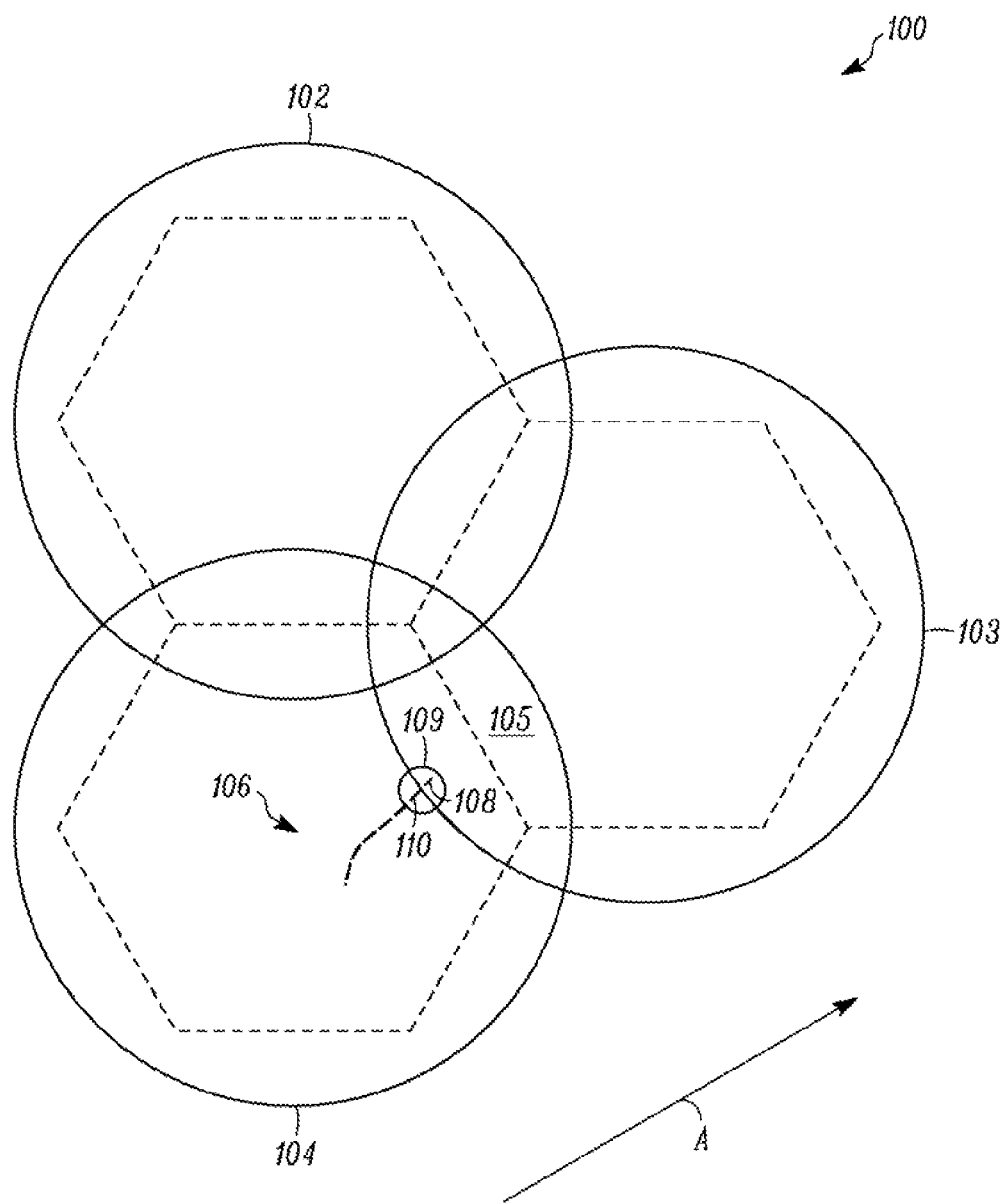
FIG. 1 depicts a plurality of adjacent wireless network coverage areas in which a mobile node without connectivity to a wireless network has formed an ad hoc network with a mobile node with connectivity to the wireless network.

Referring to FIG. 1, a wireless network 100 includes a plurality of coverage areas 102, 103, 104 (also referred to herein as cells). Wireless network 100 in one example is a wide area network (WAN), a cellular network, or a broadband network. Examples include but are not limited to Global System for Mobile Communications (GSM) networks, Code Division Multiple Access (CDMA) networks, Universal Mobile Telecommunications System (UMTS) networks, Worldwide Interoperability for Microwave Access (WiMAX) and the like. In another example, wireless network 100 is a wireless local area network (WLAN), such as a WiFi or Bluetooth hotspot. This disclosure should not be construed, however, as being limited to any of the mentioned network types because the claimed subject matter can be applied to any wireless network that serves wireless users operating mobile nodes.

Referring further to FIG. 1, each coverage area 102, 103, 104 extends to a particular geographic boundary. Where the boundaries overlap, there are overlapping coverage areas 105 in which a mobile node can receive service from both coverage areas.

Continuing to refer to FIG. 1, coverage area 104 surrounds a plurality of mobile nodes 106. In one example, a mobile node 106 is wireless user equipment that connects to wireless network 100. For instance, if network 100 were a GSM network, then a mobile node 106 could be a GSM compatible device, such as a mobile telephone, personal computer, laptop, personal digital assistant ("PDA"), media player, mobile workstation, mobile file server, etc. The same is true for other network types as well. A mobile node 106 could also comprise a combination or subcombination of these devices.

If wireless coverage area 104 is subject to congestion or interference, some of the mobile nodes 106 will be unable to connect to the network provider equipment servicing coverage area 104. However, because mobile nodes 106 are traveling in the general direction of arrow A, they will eventually enter overlapping coverage area 105 and be able to connect to the provider equipment servicing coverage area 103. Mobile node 108 will enter overlapping coverage area 105 first. When this occurs, mobile node 108 will connect with wireless network 100 through the provider equipment servicing coverage area 103. The remaining mobile nodes 106 will remain unable to connect to network 100. Nevertheless, if mobile node 108 initiates formation of an ad hoc network, such as Mobile ad hoc Network (MANET) 109, then any unconnected mobile nodes 106 within range of mobile node 108 can utilize mobile node 108 to send/receive data to/from network 100. This process will be referred to hereinafter as "tunneling" data.

Figure 2A:
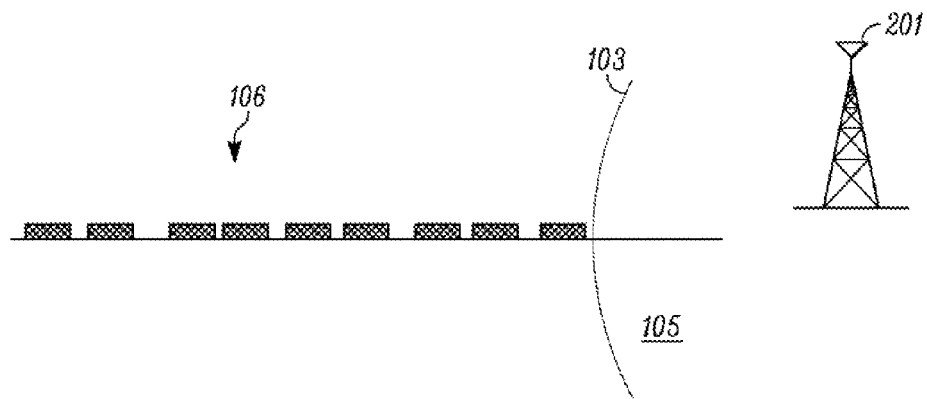
FIG. 2A-2C depict the mobile nodes of FIG. 1 during formation of the ad hoc network.
Figure 2B:
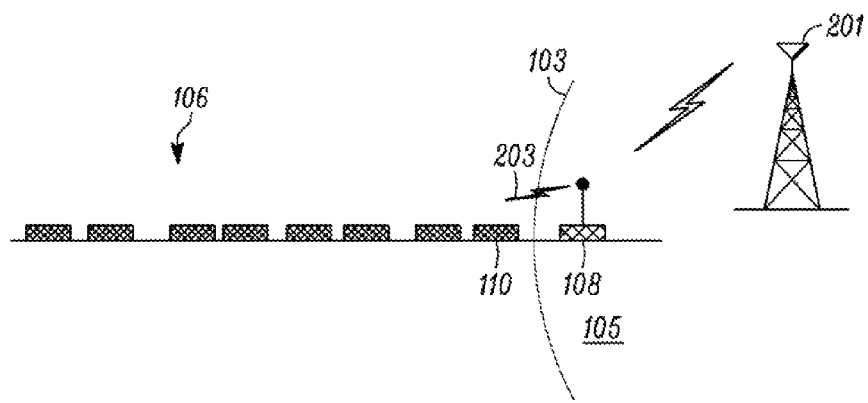
Figure 2C:
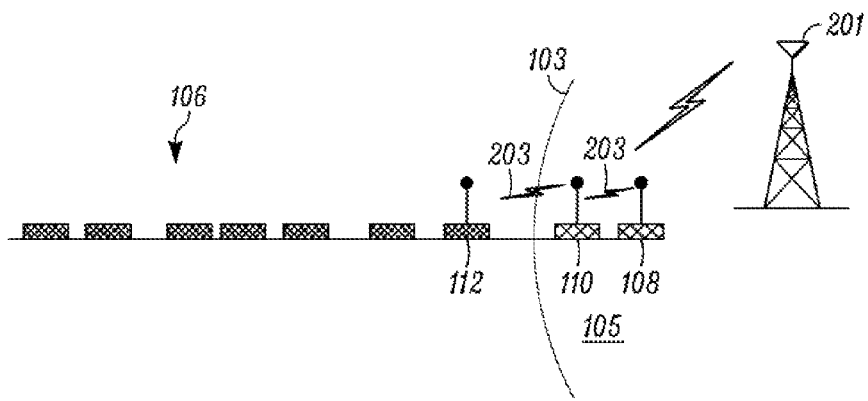

Referring to FIGS. 2A-2C, the process by which MANET network 109 is formed will now be described in more detail. In FIG. 2A, due to congestion or interference, mobile nodes 106 are not connected to the provider equipment of coverage area 104 and therefore are not connected to wireless network 100. In FIG. 2B, mobile node 108 enters overlapping coverage area 105 and connects to the provider equipment 201 servicing coverage area 103. The connection of mobile node 108 to the provider equipment 201 serves as a trigger that causes mobile node 108 to initiate formation of a MANET. Mobile node 108 initiates formation of the MANET by broadcasting a network identifier 203 to other mobile nodes 106 within range.

In FIG. 2B, mobile node 110 receives network identifier 203. Upon receipt, mobile node 110 determines, based upon predetermined criteria, whether or not to join the MANET. In one example, the predetermined criteria include the moving direction of mobile node 108 relative to mobile node 110. If mobile node 108 is moving in a direction opposite of mobile node 110, then mobile node 110 may elect not to joint the MANET because the two nodes will eventually be out of range. In another example, the criteria may include the signal strength between the nodes. If mobile node 110 receives a weak signal (e.g. below a predetermined level) from mobile node 108, mobile node 110 may elect not to joint the MANET network. In another example, the criteria may include the type of wireless network to which mobile node 108 is connected. If mobile node 108 is connected to a GSM network and mobile node 110 is a CDMA device, mobile node 110 may elect not to join the MANET. If mobile node 110 joins the MANET, then mobile node 108 can tunnel data on behalf of mobile node 110. The decision whether or not to join the MANET network is implementation and user specific. For example, the decision could be based on whether or not a CDMA node has IP data (Voice or Data) that needs to be tunneled. If a CDMA node user needs to make a Voice over IP call then that traffic can be tunneled through the GSM IP data network.

Referring to FIG. 2B, once mobile node 110 connects to the MANET, mobile node 110 also broadcasts a network identifier 203 to other mobile nodes within its range. For instance, mobile node 110 can broadcast a network identifier 203 to mobile node 112. Mobile node 112 can then determine whether or not to join the MANET. If mobile node 112 joins the MANET, then mobile node 110 can relay data on behalf of mobile node 112 to mobile node 108. Mobile node 108 can then tunnel the data from mobile node 112 to the wireless network 100. Alternatively, mobile node 110 may be connected to a wireless network distinct from the network to which node 108 is connected—in which case mobile node 110 can also tunnel data on behalf of mobile node 112, as will be discussed further herein. The remaining mobile nodes 106 can also join the MANET using the same process.

Referring to FIG. 2C, eventually, because the mobile nodes 106 are traveling in the same direction, nodes other than node 108 will enter overlapping coverage area 105. When this occurs, these nodes can also share in the tunneling of data. For instance, when node 110 enters overlapping coverage area 105 it can cease tunneling its own traffic through node 108 and begin tunneling for other mobile nodes.

Figure 3:
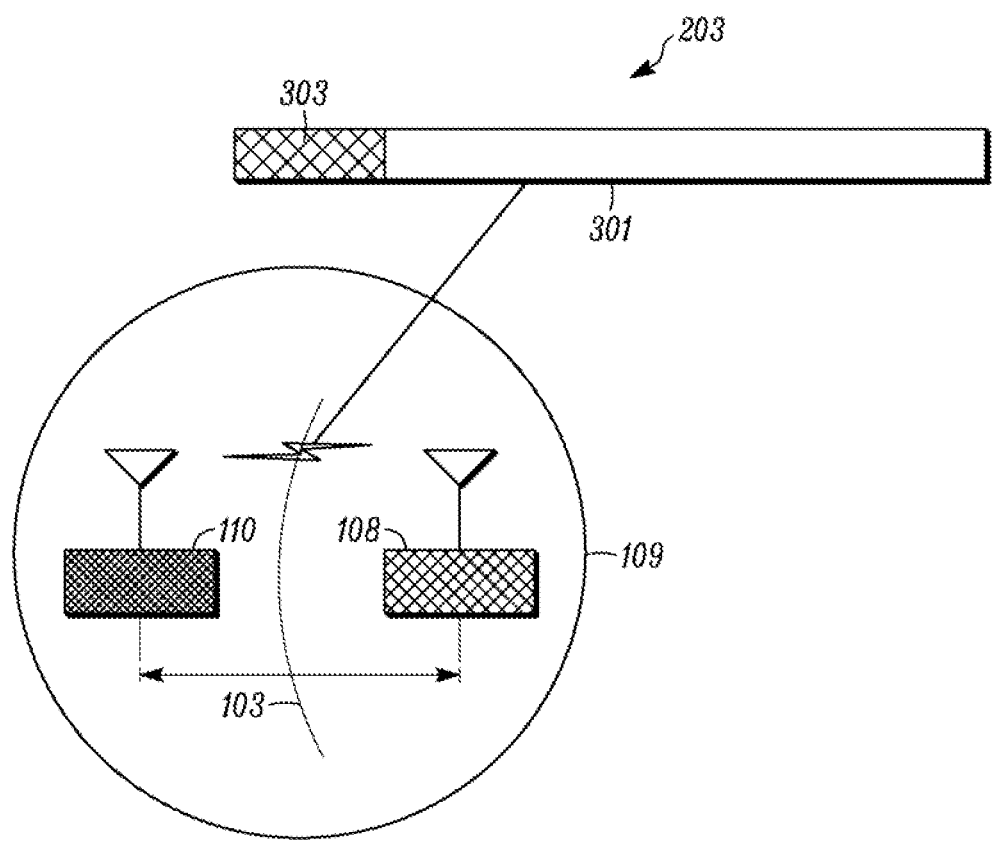
FIG. 3 depicts the mobile nodes of FIG. 1, during formation of the ad hoc network, in which the mobile node with connectivity to a wireless network broadcasts a network identifier to the mobile node without connectivity.

Referring to FIG. 3, an exemplary depiction of a network identifier 203 is shown for illustrative purposes. In the example shown, network identifier 203 includes a network name 301 and a moving direction 303. As discussed supra, including the movement direction 303 provides the mobile nodes that receive the network identifier 203 with criteria, to determine whether or not to join the MANET. The movement direction for a mobile node 106 can be obtained utilization of means, such as a compass, a global positioning system (GPS) receiver, etc. This will be further discussed herein.

Figure 4A:
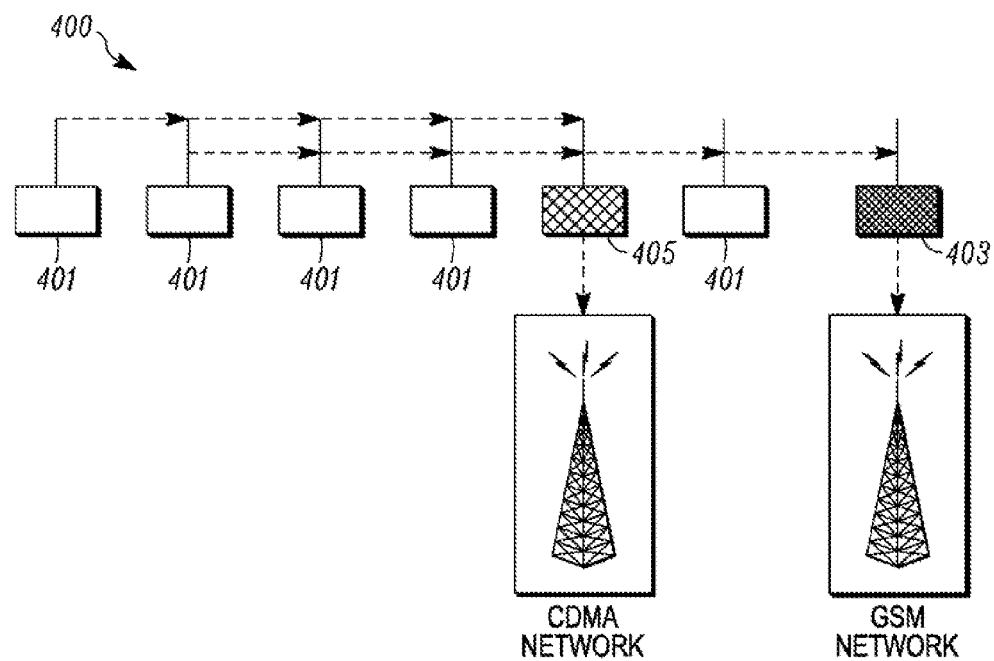
FIGS. 4A and 4B depict two exemplary ad hoc networks in which mobile nodes with connectivity are capable of tunneling data to wireless networks on behalf of mobile nodes without connectivity to those networks.
Figure 4B:
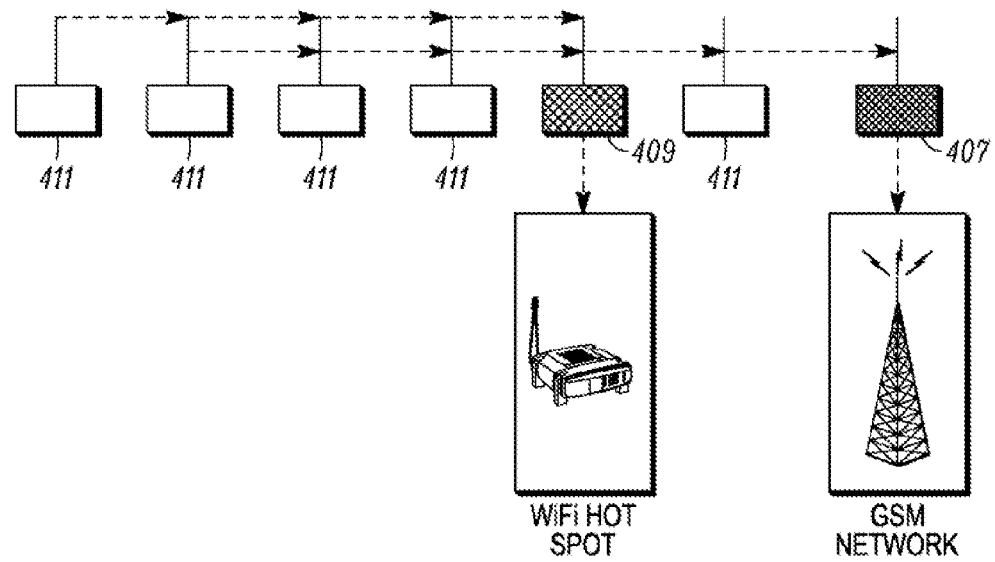

Referring to FIGS. 4A and 4B two exemplary MANET networks are shown for illustrative purposes. In FIG. 4A, MANET network 400 includes a plurality of mobile nodes 401 without wireless network connectivity and two mobile nodes 403, 405 with wireless network connectivity. Mobile node 403 is connected to a GSM network and mobile node 405 is connected to a CDMA network. Accordingly, nodes 401 have the option of tunneling data through mobile node 403 to a GSM network and/or tunneling data through node 405 to a CDMA network. The selection will depend on factors such as the type of networks with which mobile nodes 401 are configured to work and user preferences. Similarly, in FIG. 4B, node 407 is connected to a GSM network and node 409 is connected to the Internet through a WiFi "Hot Spot." Node 409 is also equipped to route voice data over the Internet by using a Voice over Internet Protocol (VOIP) provider, such as Skype™. Nodes 411 are not connected to a wireless network and therefore have the option of sending data through node 407 to a GSM network or through node 409 to the Internet.

Figure 5:
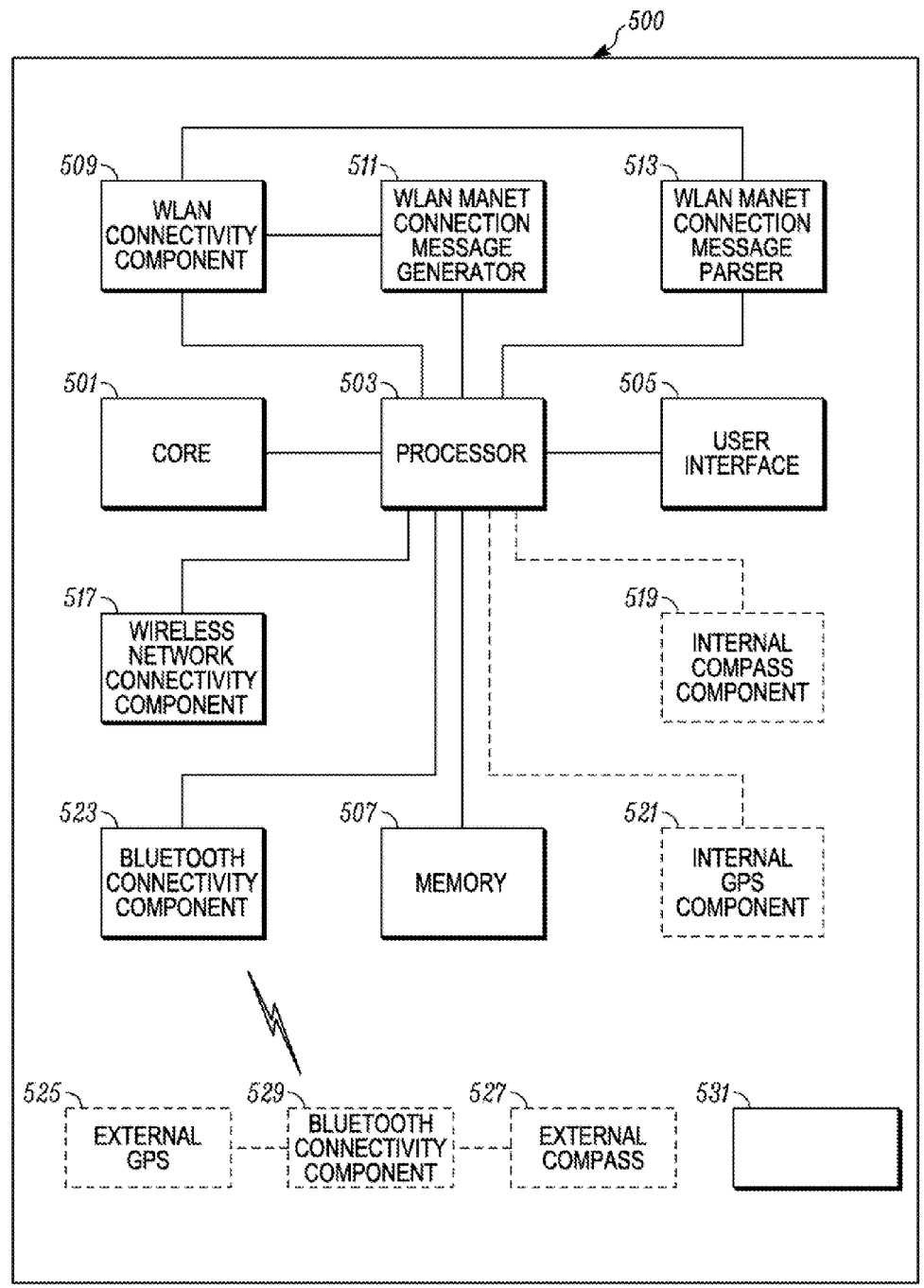
FIG. 5 is a block diagram depicting an exemplary mobile device that can form an ad hoc network with other mobile devices.

Referring now to FIG. 5, an exemplary device 500, which can be used as a mobile node or as a part of a mobile node, is shown for illustrative purposes. Device 500 includes a plurality of components, such as computer software and/or hardware components. A number of such components can be combined or divided. An exemplary component employs and/or comprises a series of computer instructions written in or implemented with any of a number of programming languages, as will be appreciated by those skilled in the art.

Referring further to FIG. 5, device 500 in one example includes a core 501, at least one processor 503, a user interface 505, a memory 507, a WLAN connectivity component 509, a WLAN connection message generator 511, a WLAN connection message parser 513, and a wireless network connectivity component 517. In addition, device 500 includes at least one of internal compass component 519, internal GPS component 521, and Bluetooth connectivity component 523.

Further referring to FIG. 5, core 501, for ease of explanation, is used to refer to device specific hardware and/or software components that allow device 500 to perform its core function(s) (e.g. mobile phone, PDA, etc.). Because a mobile node could be any number of devices, it is not desirable to list all of the possible permutations of components of which device 500 could be formed. Accordingly, only those components that are necessary to describe and enable the claimed subject matter are explicitly shown in FIG. 5. The components that are necessary to the functioning of various embodiments of device 500 are referred to as the core 501. For example, if device 500 were a mobile phone, then core 501 would include software and/or hardware components, not mentioned herein for the sake of brevity, that allow mobile node 500 to act as a mobile phone.

Processor 503 controls device 500 implements the functionality of the mobile terminal 100 by performing device specific operations and functions. Processor 503 also determines, based on user input or preprogrammed instructions, whether to form a MANET or whether to join a MANET. Device 500 could include a single processor 503 or multiple processors.

User interface 505 is the aggregate of means by which a user interacts with a mobile node. User interface includes both input components (e.g. microphone, keyboard, etc.) and output components (e.g. speakers, display, etc.).

Memory 507 provides storage on which mobile node 500 can store data (e.g. software, digital media, etc.).

WLAN connectivity component 509 is the interface by which mobile node 500 connects to wireless local area networks. In one example, WLAN connectivity component 509 is utilized as the interface to connect to a MANET. In another example, WLAN connectivity component 509 initiates formation of a MANET by broadcasting beacon signals that include the network identifier of a MANET. In a further example, WLAN connectivity component 509 receives beacon signals that include the network identifier of a MANET.

WLAN MANET connection message generator 511 creates messages by which a mobile node interacts with a MANET. In one example, WLAN MANET connection message generator creates the network identifier used by device 500 in initiate formation of a MANET. In another example, WLAN MANET connection message generator 511 creates messages to request the capabilities of other mobile nodes in a MANET. In a further example, WLAN MANET connection message generator receives messages, which inform a mobile node of the capabilities of other mobile nodes.

WLAN MANET connection message parser 513 receives message sent from mobile nodes and extracts information from these messages. In one example, WLAN MANET connection message parser 513 receives network identifiers from mobile nodes and extracts the moving direction and network name from the network identifiers.

Wireless network connectivity component 517 is the interface by which device 500 connects to a wireless network. In one example, wireless network connectivity component is radio access network interface that connects device 500 to one or more wireless networks, such as GSM, CDMA, WiMAX, etc.

Internal compass component 519 in one example is used by device 500 to determine the moving direction of the mobile node of which device 500 is a part. Alternatively, internal GPS receiver component 521 determines the moving direction of mobile node 500. In another alternative, internal compass component 519 and internal GPS component 521 are omitted, and a Bluetooth interface 523 is utilized by which device 500 can connect to an external GPS component 525 or external compass 527 connected through another Bluetooth interface 529.

Device 500 also employs at least one computer-readable signal-bearing medium 531. One example of a computer-readable signal-bearing medium 531 is a recordable data storage medium such as a magnetic, optical, and/or atomic scale data storage medium. In another example, a computer-readable signal-bearing medium is a modulated carrier signal transmitted over a network coupled to mobile node 500. Each computer-readable signal-bearing medium can be used to store software and/or logic components that are employable to carry out the methodology described herein.

Figure 6:
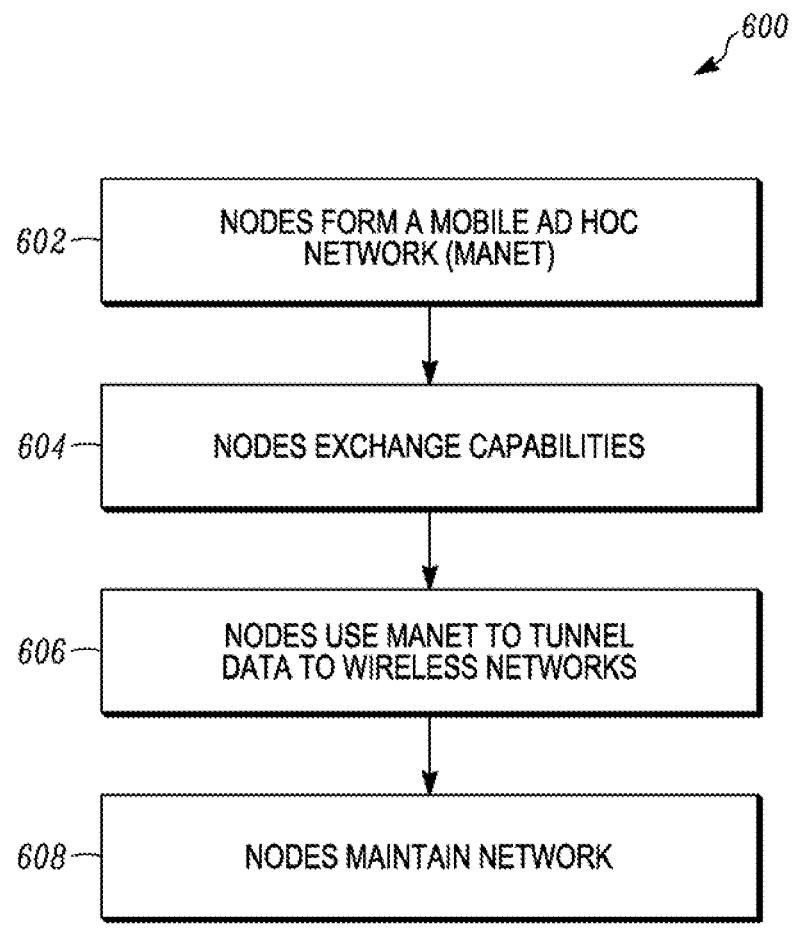
FIG. 6 depicts an exemplary process by which mobile nodes create and use an ad hoc network to tunnel data to wireless networks.

Referring to FIG. 6, an exemplary process 600 by which mobile nodes can form and use a MANET to tunnel data will now be described for illustrative purposes.

In step 602, a plurality of mobile nodes form a MANET. In one example, an initiating mobile node begins formation of the MANET in response to a connection trigger, such as connecting to a wireless network after previously not having service. In step 604, the mobile nodes exchange capabilities. In one example, the capability exchange involves a mobile node requesting the wireless network type to which an initiating mobile node is connected. In another example, a mobile node initiating a MANET periodically broadcasts the network type(s) to which it is connected. In step 606, one or more mobile nodes use the MANET to tunnel data to one or more wireless networks. In step 608, the nodes maintain the MANET network. For instance, if an initiating node leaves a MANET, responsibility for tunneling data will be passed to another node. Further, step 608, maintaining the MANET network, can occur at any point during process 600.

A more detailed description for each of these steps will now be provided for illustrative purposes.

Figure 7:
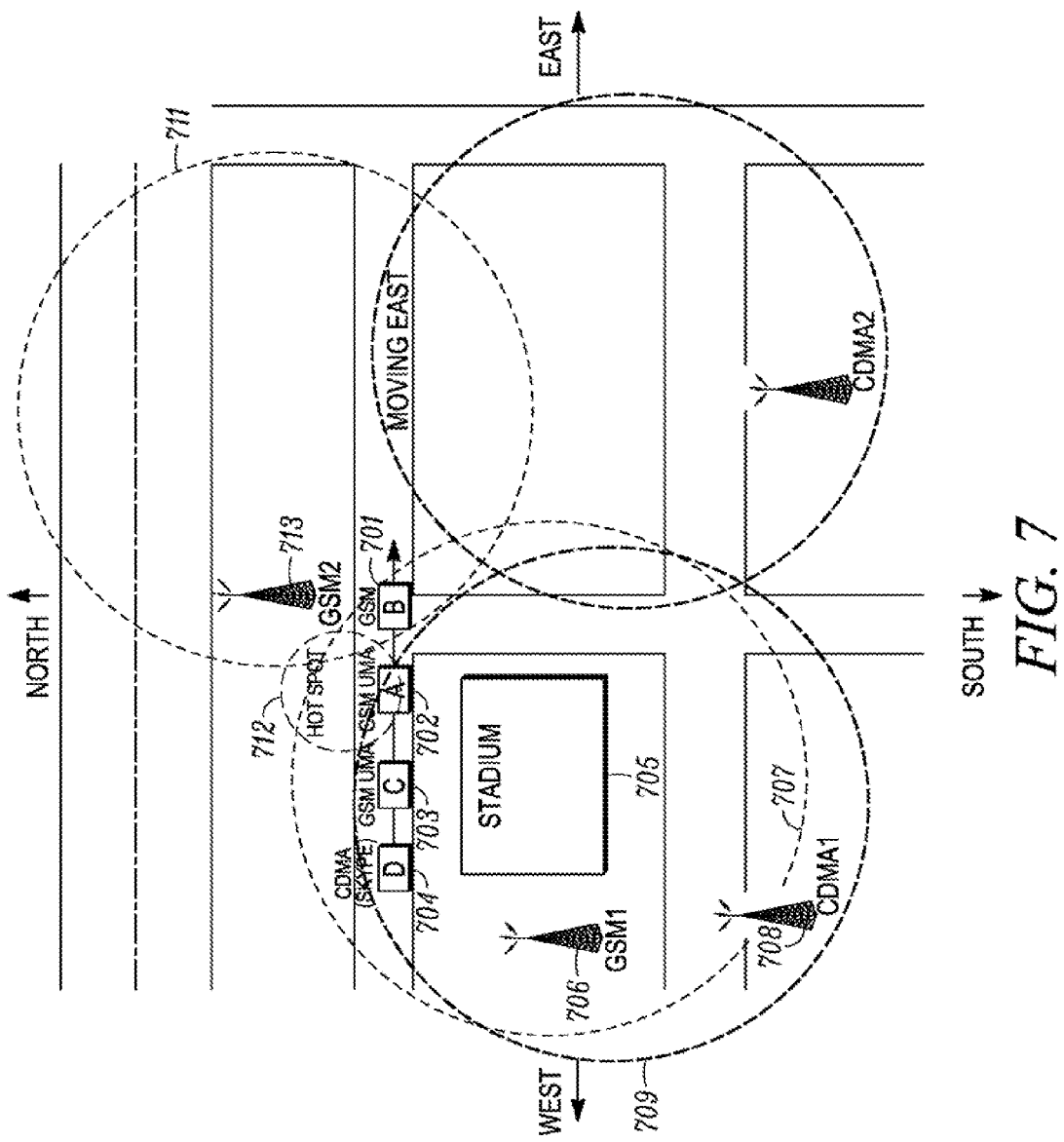
FIG. 7 depicts a plurality of overlapping wireless networks and a plurality of mobile nodes that have formed an ad hoc network.

Now referring to FIG. 7, in one example, four mobile nodes 701, 702, 703, 704 are shown moving from West to East. Mobile node 701 is configured for GSM. Mobile node 702 is configured for GSM and can also access a GSM network through a WiFi "Hot Spot" by utilizing Unlicensed Mobile Access (UMA) technology. Mobile node 703 is also a GSM/UMA device. Mobile node 704 is a CDMA/VOIP device.

The mobile nodes 701, 702, 703, and 704 are shown in route through an area near a stadium 705 in which nodes 701, 702, 703, 704 are unable to connect to provider equipment 706 serving GSM coverage area 707 and provider equipment 708 serving CDMA coverage area 709. Because nodes 701, 702, 703, 704 are traveling East, they eventually reach GSM coverage area 711 and WiFi "Hot Spot" 712. Accordingly, in FIG. 7, node 701 is connected to the provider equipment 713 serving coverage area 711 and mobile node 702 is connected to WiFi Hot Spot 712. Thus, both mobile node 701 and mobile node 702 are positioned such that they can form a MANET and tunnel data on behalf of nodes 703 and 704. An application of process 600 to the scenario set forth in FIG. 7 now follows.

Figure 8:
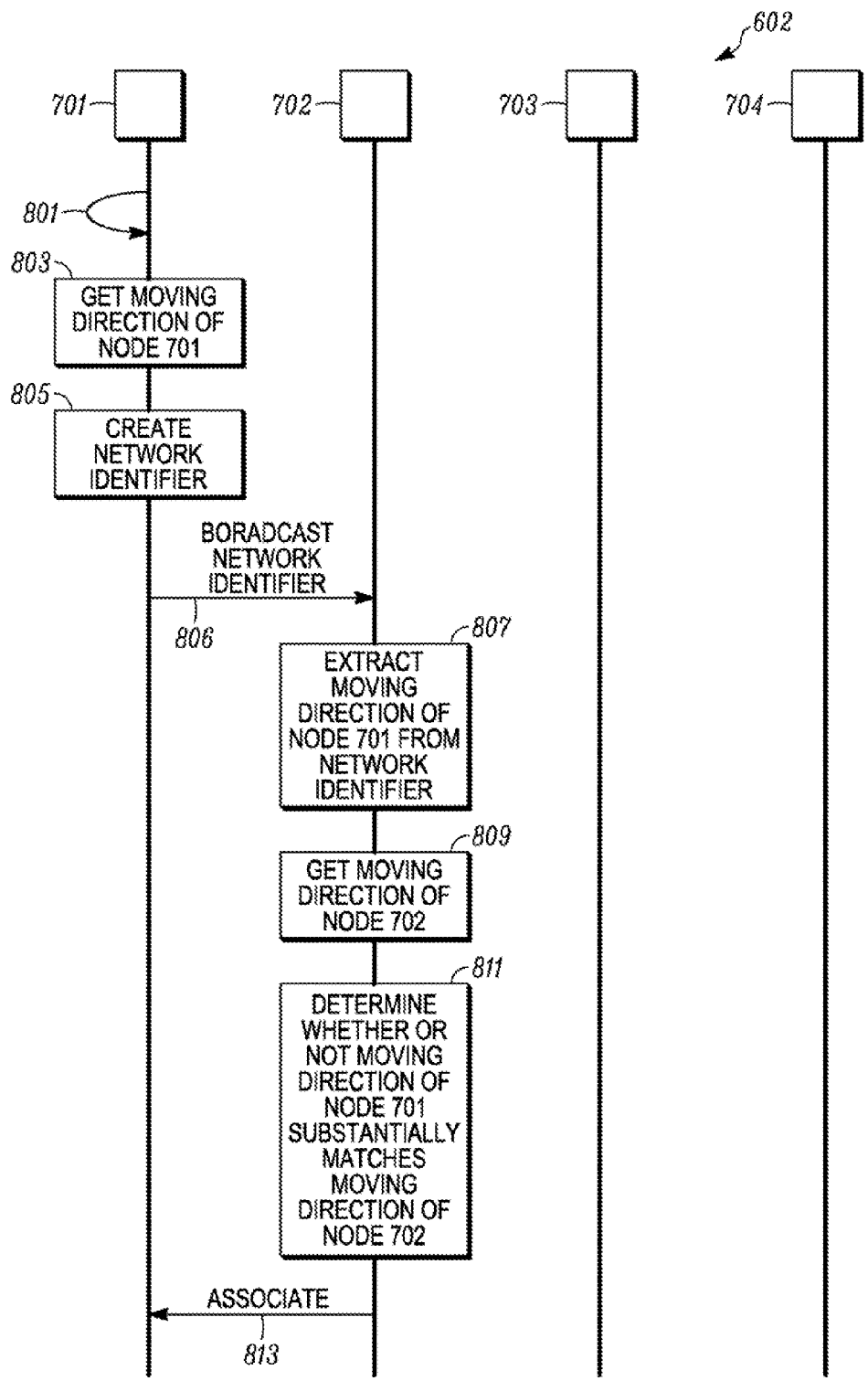
FIG. 8-10 depicts an exemplary process by which the plurality of mobile nodes of FIG. 7 form an ad hoc network and tunnel data.

Referring to FIGS. 5 and 8, in step 801, a connection trigger occurs. In one example the connection trigger occurs when mobile node 701 connects to a wireless network by connecting to the provider equipment in coverage area 711 after being in wireless area 709 where it was unable to connect to provider equipment 708. In another example, the connection trigger is user initiated; for instance, by the operator of mobile node 701 entering input causing mobile node 701 to form a MANET. The particular trigger could take on a variety of forms. In order to form a MANET and tunnel data, however, mobile node 701 must have connectivity to a wireless network. In any case, when the connection trigger occurs, wireless network connectivity component 517 detects a wireless network connection and triggers the processor 503 to obtain the moving direction of node 701.

In step 803, mobile node 701, in response to connecting to the wireless network, determines its moving direction. In one example, this is done through employment of internal compass/GPS 519, 521 or external compass/GPS 525, 527.

In step 805, the processor 503 triggers the WLAN MANET connection message generator 511 to create a network identifier. In one example, the network identifier includes a network name and the moving direction. In a further example, the network identifier is a Service Set Identifier (SSID) as set forth in the IEEE 802.11 specifications. The SSID is sent as part of the IEEE 802.11 beacon signal. The 802.11 specifications specify that the SSID is between 1-32 octets. In one exemplary embodiment, node 501 embeds the moving direction in the first octet (FIG. 3.) For example, the first 4 bits can be set for reserve and the second 4 bits can be used for direction according to Table 1.

TABLE 1

| Direction | Bits |
|---|---|
| N | 0000 |
| NNE | 0001 |
| NE | 0010 |
| NEE | 0011 |
| E | 0100 |
| EES | 0101 |
| ES | 0110 |
| ESS | 0111 |
| S | 1000 |
| SSW | 1001 |
| SW | 1010 |
| SWW | 1011 |
| W | 1100 |
| WWN | 1101 |
| WN | 1110 |
| WNN | 1111 |

Wherein the identifiers provided under "Direction" in the first column each represent one of the directions shown in the legend provided below in diagram 1.

Diagram 1

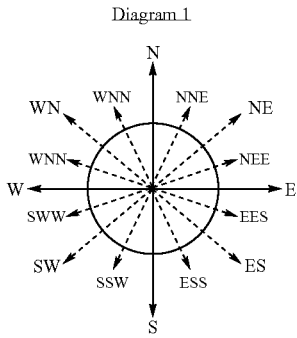

In step 806, WLAN MANET connection message generator then triggers the WLAN connectivity component 509 to start an ad-hoc network with the network identifier. The network identifier is broadcast and includes a network name and moving direction. Node 701 is thus referred to the "initiator".

Any nodes within the coverage area of node 701 (e.g. node 702) will detect the beacon signal. WLAN connectivity component 509 of node 702 will receive the broadcast message, and send it to WLAN MANET connection message parser 513. WLAN MANET connection message parser 513, in step 807, will extract, or determine, the moving direction of node 701 from network identifier.

Node 702 WLAN connection message parser 513 will then send the moving direction of node 701 to processor 503. Processor 503, in step 809, will then obtain the moving direction of node 702 through employment of internal compass 519, internal GPS 521, external GPS 525, or external compass 527.

In step 811, the processor 503 of mobile node 702 will determine whether the network identifier meets predetermined criteria. In one example, the predetermined criteria includes that the moving direction of node 702 must be substantially the same as the moving direction of node 701. Processor 503 of node 702 will thus compare the moving direction of node 701 to the moving direction of node 702. If there is a substantial match then, in step 813, node 702 will connect or associate with the MANET. If there is not a substantial match, then node 702 will not associate with the MANET and will look for other beacon signals. In one example, a substantial match would occur if the bits representing a direction of the one node matched the bits representing the direction of another node. For example, if node 702 is moving North East it will consider 00000010 in the network identifier from node 701 as a substantial match. In another example, a substantial match would occur if the bits from one node were only one bit removed from the bits from the other node. For example, if node 702 were moving North East, it would consider either 00000011 or 00000001 as a substantial match.

After the MANET is created, node 702 will broadcast the network identifier and other nodes can associate with the MANET using the process of FIG. 8. When the MANET is formed, node 701 is referred to as the "Tunnel End" because it is the interface between the wireless network and the MANET.

Figure 9:
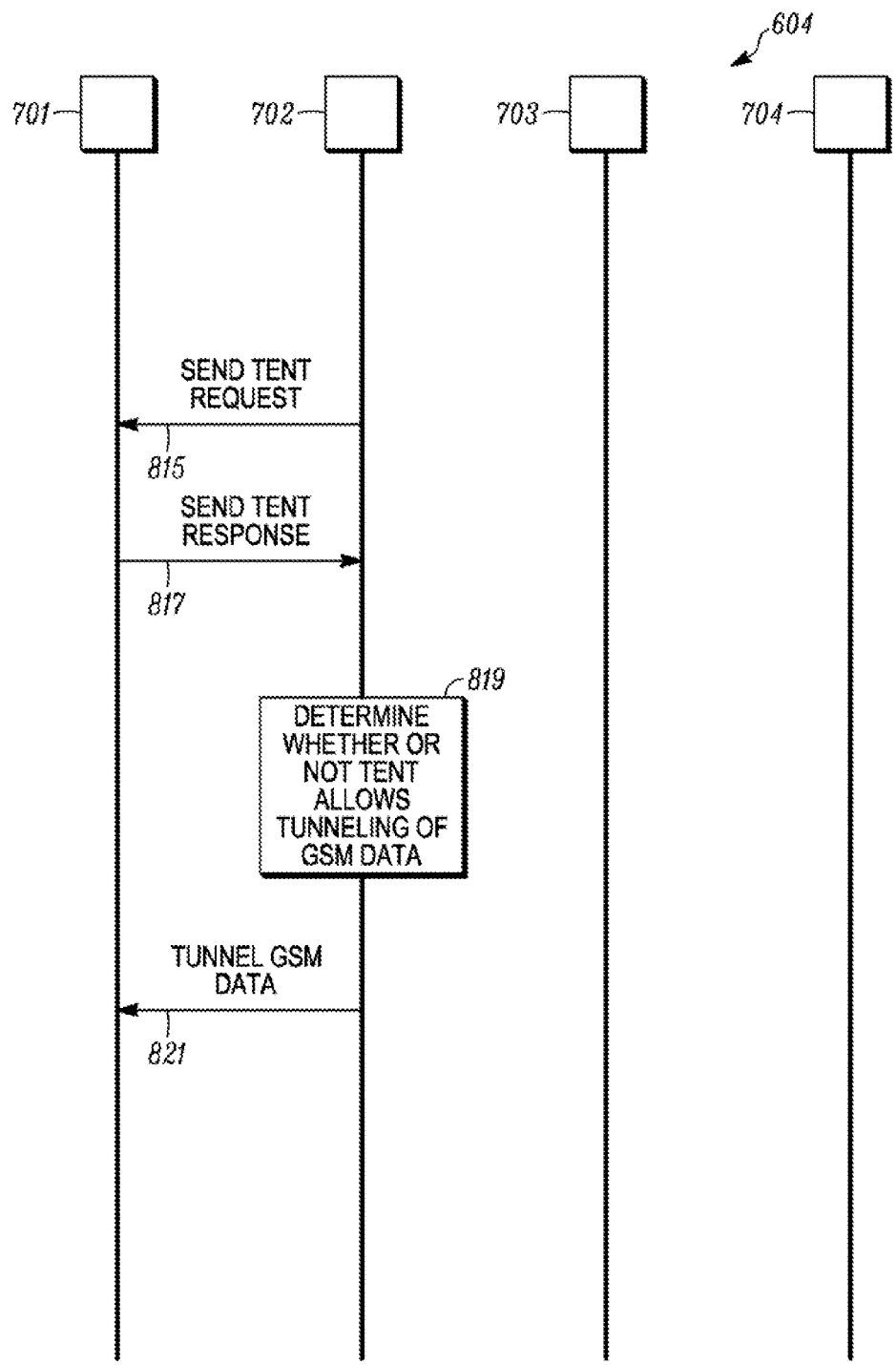
Figure 10:
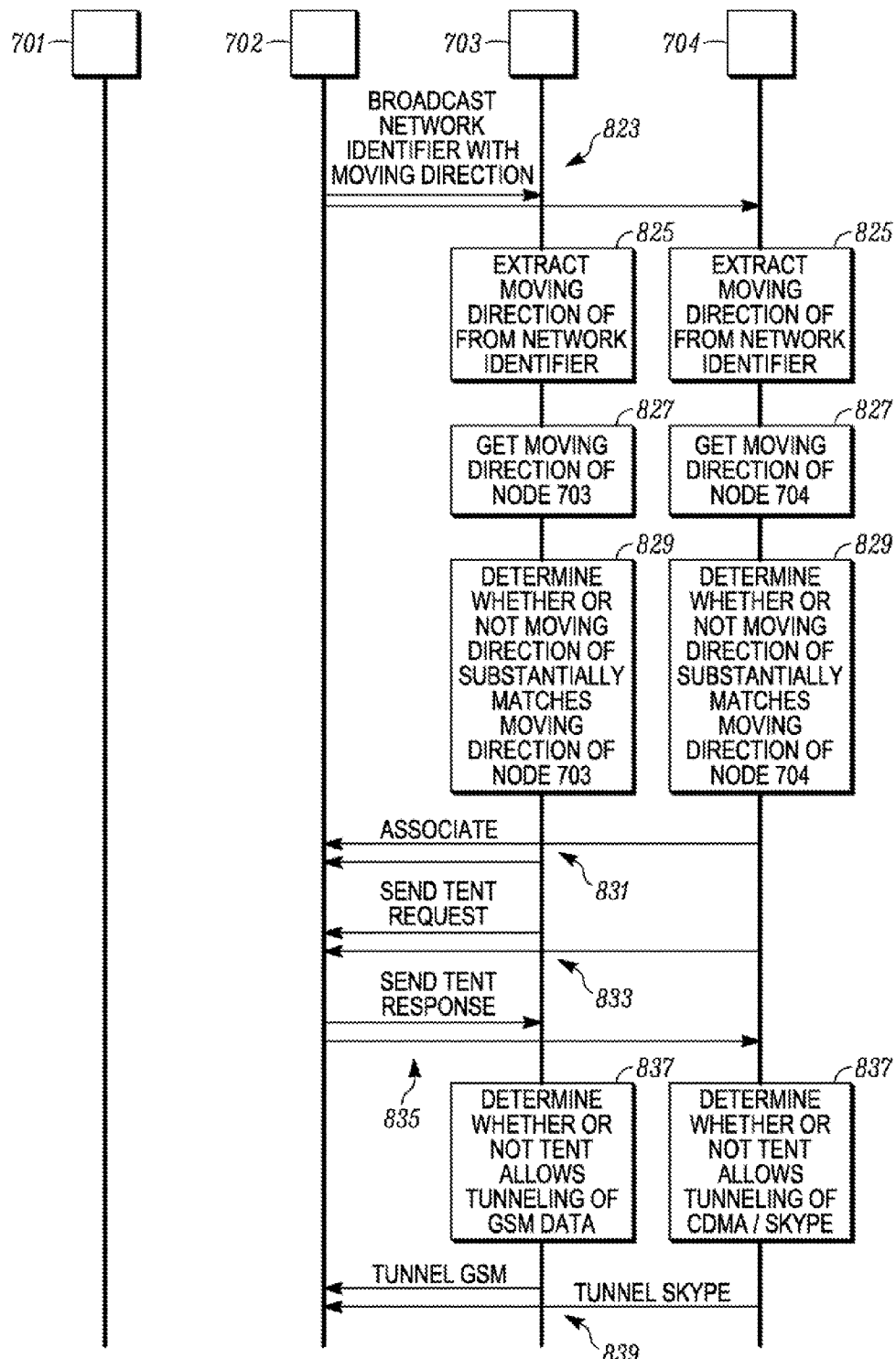

Referring to FIGS. 9 and 10, an exemplary description of process 604 by which nodes 701, 702 exchange capabilities is now provided for illustrative purposes.

In step 815, WLAN MANET Connection Message Generator 513 of node 702 sends a Tunnel End Network Type (TENT) Request message, through WLAN connectivity component 509, to node 701. The TENT request is essentially a message that requests the tunnel end, i.e. node 701, to send node 702 the wireless networks types to which it is connected, either directly or indirectly (i.e. through other nodes). The TENT Request message in one example has the following format:

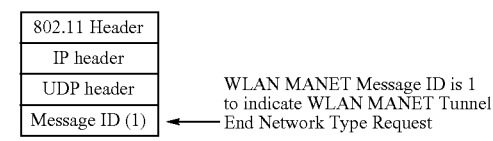

In step 817, WLAN MANET Connection Message Generator 511 of node 701 sends a TENT Response message, through its WLAN connectivity component 509, to node 702. The TENT Response informs node 702 of the wireless network(s) to which it can tunnel data. In an alternative embodiment, node 701 broadcasts the TENT response message, at predetermined intervals, to the nodes within range, thereby eliminating the need for a TENT request message. In one example, the TENT response message has the following format:

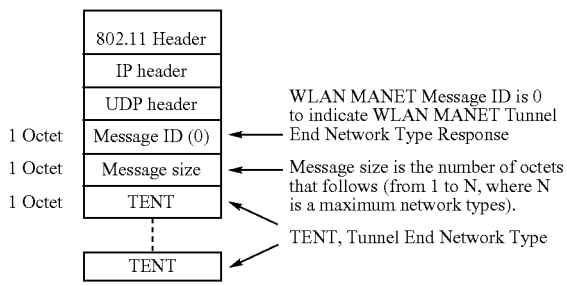

After receiving the TENT response message, processor 503 of node 702 will know the wireless network type(s) to which node 701 can tunnel data. In step 819, processor 503 of node 702 will determine whether or not node 701 can tunnel data to a network type to which node 702 wants to connect. If node 701 can interface to a wireless network to which node 702 wants to connect, node 702 will associate, or connect, with the MANET. Thereafter, in step 821, node 702 will tunnel data through node 701 to the wireless network. Tunneling data involves node 702 exchanging data with the wireless network through node 701. That is, node 702 will send data to the wireless network through node 701 and receive data from the wireless network through node 701. An exemplary format for a tunneled data packet is shown below:

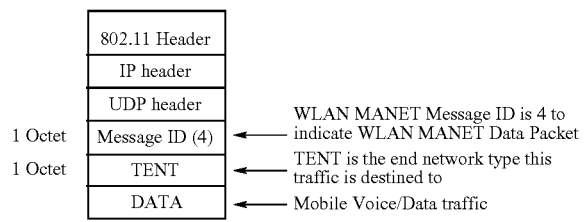

Referring to FIG. 10, as nodes 703 and 704 come within range of nodes 701, 702 they can also join the MANET. In step 823, node 702 broadcasts the network identifier. In step 825, nodes 703 and 704 extract the moving direction from the network identifier. In step 827, nodes 703, 704 determine their own moving directions. In step 829, nodes 703 and 704 determine whether their moving directions substantially match the moving direction provided in the network identifier. If their moving directions match, then, in step 831, nodes 703 and 704 will associate with the MANET. After associating with the MANET, nodes 703 and 704 will send, in step 833, TENT requests to node 702. Node 702, in step 835, will send a TENT response indicating that nodes 703, 704 can tunnel GSM data through node 701, GSM data through the UMA access of node 702, or VOIP data through node 702. In step 837, nodes 703, 704 will determine whether or not nodes 701, 702 can tunnel data to network types to which node 703, 704 want to connect. If so, then in step 839, nodes 703, 704 will tunnel data through these nodes.

A description of the process 608 by which the MANET is maintained will now be provided for illustrative purposes.

Referring now to FIG. 7, during the operation of a MANET, it is possible that mobile nodes may abruptly change direction or otherwise engage in behavior that causes them to disconnect from the MANET. If a tunnel end node leaves the MANET and stops tunneling traffic on behalf of other nodes, it is important that the tunnel end nodes hand off tunneling responsibilities to other nodes.

In one example, handoff can be achieved by mobile nodes monitoring the signal strength of the node through which they are connected to a MANET. When this power goes below a specific threshold (e.g. due to an increase in distance between the node and the remainder of the MANET), the monitoring node will infer that the node has changed direction. Accordingly, the monitoring node can scan around for other MANET networks within its coverage area moving in the same direction. If another MANET is found, the node can hand off the tunneling responsibilities to another network.

For instance, node 703, in FIG. 7, can constantly monitor the receive power from node 702. If the receive power drops below a certain threshold, node 703 can begin to scan for other MANET networks within its coverage area.

In another example, an end node might decide that it no longer wants to be part of the MANET or no longer wants to tunnel data. This could be for a number of reasons, such as user preference or because the nodes, on whose behalf the end node is tunneling data, have entered the coverage area. Whatever the case, the end node will hand off the tunneled streams to the nodes that just entered the coverage area.

For instance, referring to FIG. 7, as the nodes move East, node 702 will enter coverage area 711. At this point, node 701 may want to stop tunneling data on behalf of node 702. Alternatively, node 701 will broadcast a WLAN MANET Tunnel End Detach Request. The WLAN MANET Tunnel End Detach Request serves as a notification that node 701 will no longer exchange data with the wireless network on behalf of other mobile nodes. An exemplary format for the detach request is shown below:

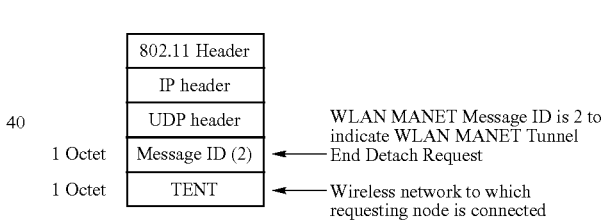

If there is a node in the same MANET that is interfaced to the same wireless network and is willing to become a "Tunnel End" Node, then this node will send back a WLAN MANET Tunnel End Detach Response message to Node 701. The WLAN MANET Tunnel End Detach Response indicates to the mobile nodes in the MANET that the node is available to act as a "tunnel end", i.e. is available for employment to tunnel data to the wireless network. The new "tunnel end" node can then start exchanging data with the wireless network on behalf of the other mobile nodes. An exemplary format for the Tunnel End Detach Response is shown below:

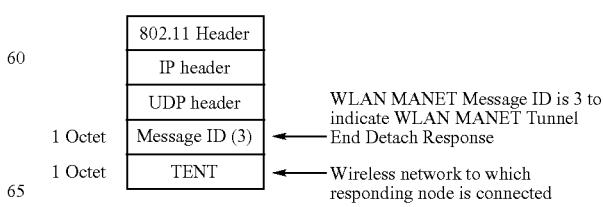

While particular embodiments have been shown and described, it will be apparent to those skilled in the art that changes and modifications may be made without departing from the principles set forth herein. The matter set forth in the foregoing description and accompanying drawings is offered by way of illustration only and not as a limitation.

The invention claimed is:

1. A method for determining, in a mobile node, whether to join a wireless network, comprising:
   receiving a first broadcast message via a wireless ad hoc network from at least one other mobile node, wherein the first broadcast message includes a network identifier and a moving direction for the at least one other mobile node; wherein the moving direction is embedded in the network identifier of the first broadcast message;
   determining the moving direction of the mobile node, and comparing the moving direction of the mobile node to the moving direction of the at least one other mobile node;
   connecting to the at least one other mobile node via the wireless ad hoc network in response to a determination that the moving direction of the mobile node is substantially the same as the moving direction of the at least one other mobile node; and
   determining that the mobile node is unable to connect to a wireless cellular network via the at least one other mobile node;
   in response to said determining that the mobile node is unable to connect to a wireless cellular network, sending a request message to the at least one other mobile node that is a tunnel end mobile node, the request message requesting network types to which the at least one other mobile node is connected; and
   employing the at least one other mobile node to exchange data with the wireless cellular network in response to a determination that the at least one other mobile node is connected to the wireless cellular network.

2. The method of claim 1, wherein the step of receiving the network identifier comprises:
   receiving a message that includes a network name and the moving direction for the at least one other mobile node.

3. The method of claim 1, wherein the step of determining the moving direction of the mobile node comprises:
   employing at least one of an internal compass, an external compass, an internal GPS receiver, and an external GPS receiver to determine the moving direction.

4. The method of claim 1, further comprising:
   receiving an indication that the moving direction of the at least one other mobile node has changed; and
   disconnecting from the wireless ad hoc network in response to receipt of the indication.

5. The method of claim 4, wherein the step of receiving the indication comprises:
   measuring signal strength between the mobile node and the at least one other mobile node;
   determining that the at least one other mobile node has changed direction if the signal strength falls below a predetermined level.

6. The method of claim 1, further comprising:
   connecting to the wireless cellular network; and
   stopping the employment of the at least one other mobile node to exchange data with the wireless cellular network.

7. The method of claim 6, further comprising:
   broadcasting a message indicating that the mobile node is available for employment to exchange data with the wireless cellular network.

8. A mobile device, comprising:
   a wireless ad hoc network interface configured to receive a first broadcast message including a network identifier from at least one other mobile device, wherein the network identifier includes a moving direction for the at least one other mobile device and wherein the moving direction is embedded in the network identifier of the first broadcast message;
   a processor configured to:
   receive data describing the moving direction of the mobile device from a direction finding apparatus;
   compare the moving direction of the mobile device to the moving direction of the at least one other mobile device,
   join the wireless ad hoc network in response to a determination that the moving direction the mobile device is substantially the same as the moving direction of the at least one other mobile device,
   determine that the mobile device is unable to connect to the wireless cellular network,
   in response to the determining that the mobile node is unable to connect to a wireless cellular network, send a request message to the at least one other mobile device that is a tunnel end mobile device, the request message requesting network types to which the least one other mobile device is connected, and
   employ the at least one other mobile device to exchange data with the wireless cellular network in response to a determination that the at least one other mobile device is connected to the wireless cellular network.

9. The mobile device of claim 8, wherein the processor is further configured to extract a network name and the moving direction of the at least one other mobile node from the network identifier.

10. The mobile device of claim 8, wherein the direction finding apparatus comprises at least one of an external compass, an internal compass, an external GPS receiver, and an internal GPS receiver.

11. The mobile device of claim 8, wherein the processor is further configured to receive an indication that the moving direction of the at least one other mobile device has changed and to disconnect from the wireless ad hoc network in response to receipt of the indication.

12. The mobile device of claim 8, wherein the processor is further configured to measure signal strength between the mobile device and the at least one other mobile device and to determine that the at least one other mobile device has changed direction if the signal strength falls below a predetermined level.

13. The mobile device of claim 8, wherein the processor is further configured to stop employment of the at least one other mobile device when the mobile device connects to the wireless cellular network.

14. The mobile device of claim 13, wherein the processor is further configured to broadcast a message indicating that the mobile device is available for employment to exchange data with the wireless cellular network.

* * * * *